United States Patent
Vick et al.

[19]

[11] Patent Number: 5,830,053
[45] Date of Patent: Nov. 3, 1998

[54] OESOPHAGUS SEALING

[75] Inventors: Albert James Vick; Denis Brett; Harry Schulz; Paul Stapleton; Jeffrey Owen, all of Queensland, Australia

[73] Assignee: Meat Research Corporation, Sydney, Australia

[21] Appl. No.: 765,986
[22] PCT Filed: May 10, 1996
[86] PCT No.: PCT/AU96/00287
  § 371 Date: Jan. 2, 1997
  § 102(e) Date: Jan. 2, 1997
[87] PCT Pub. No.: WO96/35332
  PCT Pub. Date: Nov. 14, 1996

[30] Foreign Application Priority Data

May 11, 1995 [AU] Australia ............... PN2910
Sep. 8, 1995 [AU] Australia ............... PN5322

[51] Int. Cl.⁶ .................................... A22B 5/14
[52] U.S. Cl. ............................. 452/176; 138/89
[58] Field of Search .............. 452/176; 138/89

[56] References Cited

U.S. PATENT DOCUMENTS

| | | |
|---|---|---|
| 4,320,557 | 3/1982 | Speedie . |
| 4,343,066 | 8/1982 | Lance . |
| 5,120,266 | 6/1992 | Aubert ................ 452/176 |
| 5,643,076 | 7/1997 | Heurman et al. ......... 452/176 |

FOREIGN PATENT DOCUMENTS

| | | |
|---|---|---|
| 54228 | of 1912 | Australia ............... 452/176 |
| 4572779 | 10/1979 | Australia . |
| 4305879 | 7/1980 | Australia . |
| 4623179 | 10/1980 | Australia . |
| 0330466 | 8/1989 | European Pat. Off. . |
| 1100499 | 2/1961 | Germany . |
| WO 9417669 | 8/1994 | WIPO . |

*Primary Examiner*—Willis Little
*Attorney, Agent, or Firm*—Alan Kamrath; Peterson, Wicks, Nemer & Kamrath, P.A.

[57] ABSTRACT

An oesophagus seal for sealing the oesophagus in a slaughtered animal comprises a plug (10) for insertion into the oesophagus (40) and a retainer in the form of a clamp (20) which internally engages and clamps to tissues of the oesophagus (40) to resist disengagement of the plug. The plug (10) has an outer peripheral clamp surface (13) and the clamp (20) is in the form of a clamp ring (21) which clamps the internal mucosa (41) of the oesophagus (40) between the clamp ring (21) and the outside clamp surface (13). The plug (10) has a reduced diameter neck (15) and a conical ramped outer surface (16) leading to the clamp surface. The clamp ring (21) is initially located beyond the neck (15) and is advanceable so that tissues (41) surrounding and projecting into the neck portion (15), e.g. by application of a vacuum, will be pinched between the advancing clamp ring (21) and the surface (16) and, upon further advance of the clamp ring (21), the tissues (41) are pinched between the clamp ring (21) and the outer clamp surface (13). There is also provided an oesophagus sealing system comprising an applicator rod (30) having an end for mounting of the oesophagus seal, and having an associated actuator (35) which is selectively moveable axially to move the clamp (20) so as to engage and clamp the tissues (41) of the oesophagus (40) between the clamp (20) and the plug (10).

20 Claims, 5 Drawing Sheets

OESOPHAGUS SEALING

This invention relates to sealing of the oesophagus in a slaughtered animal.

The sealing of the oesophagus in a slaughtered animal is needed to contain the contents of the rumen and prevent contamination of the surfaces of edible organs and tissues during the dressing process. Of particular concern is the tongue and head meat and also preventing cross contamination of other carcasses.

Presently used techniques or apparatus used for sealing or closing the oesophagus include:

(a) tying the weasand (the common industry term for the oesophagus) with a piece of string to prevent escape of the contents of the paunch;

(b) applying a plastic clip seal by means of a rodding tool which is pushed up the oesophagus to the rumen leaving the clip at the junction of the oesophagus and the rumen where it constricts and closes the oesophagus; and (c) application of an elastrator ring located on the end of a rodding tool by severing the oesophagus, the severed end being inserted through the end of the rodding tool and through the rubber ring, after which the rod with the ring on the end is pushed up the oesophagus to the paunch where the elastrator ring is released to clamp and seal the oesophagus.

All of these prior systems require the making of incisions through the animal's hide in the neck area so as to gain access to the oesophagus. The possibility of contamination of the sterile surfaces of the carcass is greatest during such hide opening operations.

There have been proposals to seal the oesophagus by insertion of a plug having a shape and size to fit tightly in the oesophagus and resist dislodgment. Patent specification Nos. AU-46231/79 and WO-94/17669 show such systems, however such plugs are not widely accepted and used because they are believed to be unreliable in effectively sealing the oesophagus or remaining in position.

It is an object of the present invention to provide an effective oesophagus seal and a sealing system which can eliminate the need for knife work on the carcass.

According to the present invention there is provided an oesophagus seal for sealing the oesophagus in a slaughtered animal, the oesophagus seal comprising a plug for insertion into the oesophagus to a point where sealing of the oesophagus is desired, and a retainer associated with the plug for internally engaging tissues of the oesophagus to resist disengagement of the plug by holding or retaining the plug in position to seal the oesophagus, the retainer comprising a clamp which is operative to clamp internal tissues of the oesophagus.

By providing an oesophagus seal according to the present invention, it is possible to insert and apply the sealing device internally in the oesophagus, e.g. through the animal's oral cavity, thereby eliminating the need for knife work on the neck to gain access to the oesophagus as required in the past for the externally applied closures. The clamp enables the oesophagus to be reliably sealed and to remain sealed during handling and processing of the carcass.

Preferably the clamp is operative to clamp tissues of the oesophagus by pinching the tissues. The oesophagus of the animal comprises the tunica muscularis and its associated internal lining mucosa, the clamp being operative to clamp the mucosa by pinching internally so that the mucosa separate from the tunica muscularis in the region where the clamp pinches but without the mucosa being pierced or perforated.

The realisation that the mucosa readily separate from the tunica muscularis if pinched internally has led to the development of a preferred design of the seal in which the plug has an outer clamp surface extending completely around the periphery of the plug and adjacent the internal tissues and the clamp is operative to clamp the internal tissues against the outer clamp surface throughout its circumference so that passage of a fluid between the internal tissues and the plug at any part of the circumference of the clamp surface is prevented. Preferably the clamp is in the form of a clamp ring which is operative to clamp the internal tissues of the oesophagus between the clamp ring and the outside clamp surface of the plug. Preferably the clamp ring is operative to clamp the tissues by pinching the tissues between the clamp ring and the outside clamp surface of the plug and resisting disengagement by a tight interference fit.

The outer clamp surface may be cylindrical so that the clamp ring in use surrounds the cylindrical outer clamp surface and pinches tissues of the oesophagus between the clamp ring and the cylindrical outer clamp surface.

The plug may have a closed inner end and a reduced diameter neck portion located further from the closed inner end than the outer clamp surface, the neck portion having a conical ramped outer surface leading to the clamp surface, the clamp ring having an inside diameter greater than the outside diameter of the neck portion, the clamp ring initially being located beyond the neck portion and being advanceable towards the inner end of the plug when the plug has been inserted into the oesophagus to the point where sealing of the oesophagus is desired whereby tissues surrounding and projecting into the neck portion will be pinched between the advancing clamp ring and the conical ramped outside surface of the neck portion and, upon further advance of the clamp ring the tissues of the oesophagus will be clamped between the clamp ring and the outer clamp surface of the plug.

In one possible embodiment, the clamp ring may be formed integrally with the plug, the connection between the clamp ring and the plug having a weakened area which can rupture when an axial force is applied to the clamp ring so as to separate the clamp ring from the plug and advance it towards the closed inner end of the plug to effect clamping of the tissues. In this embodiment, the plug may be adapted to be mounted to the end of an applicator rod which in use is to be inserted along the oesophagus and wherein the integral formation of the clamp ring with the plug includes gas passages enabling a vacuum applied behind the plug when located in the oesophagus to be communicated through the gas passages to the neck portion whereby tissues of the oesophagus can be drawn into the neck portion before advancement of the clamp ring to clamp the tissues drawn into the neck portion.

The present invention also provides an oesophagus sealing system comprising an oesophagus seal according to the first aspect of the invention and an applicator rod having an end for mounting of the oesophagus seal, the applicator rod having an associated actuator which is selectively moveable axially to move the clamp so as to engage and clamp the tissues of the oesophagus between the clamp and the plug. The applicator rod preferably has a vacuum passage extending therethrough, the vacuum passage opening outwardly immediately behind the end where the plug is use mounted whereby in use a vacuum can be applied immediately behind the plug when it has been moved to the point where sealing of the oesophagus is desired, the application of the vacuum drawing tissues of the oesophagus into closer relationship with the plug to facilitate clamping thereof.

In a further aspect of the invention there is provided an oesophagus sealing system comprising an oesophagus seal according to the first aspect of the invention and an applicator for mounting of the oesophagus seal, the applicator comprising a plug holder having a front end to which the plug is in use mounted and which is selectively disconnectable from the plug when the plug is installed at the desired point in the oesophagus, the ring holder arranged to receive and hold the clamp ring, and a ring holder being selectively axially movable relative to the plug whereby in use the clamp ring can be relatively advanced into operative relationship with the plug so as to clamp tissues of the oesophagus between the clamp ring and the plug. In this embodiment, the plug holder may have an intermediate section behind the front end thereof to which the plug is in use mounted, the intermediate section being of reduced diameter compared to the outside clamp surface of the plug, the applicator having a vacuum passage leading to the intermediate section, the ring holder in use locating the clamp ring beyond the intermediate section relative to the plug whereby the application of vacuum through the vacuum passage to the intermediate section draws tissues of the oesophagus inwardly constrict around the intermediate section, whereafter axial advancement of the ring holder and the clamp ring past the intermediate section and into operative relationship with the plug causes pinching and hence clamping of the tissues between the clamp ring and the outside clamp surface of the plug.

Possible and preferred features of the present invention will now be described with particular reference to the accompanying drawings. However it is to be understood that the features illustrated in and described with reference to the drawings are not to be construed as limiting on the scope of the invention. In the drawings.

Figure 1:
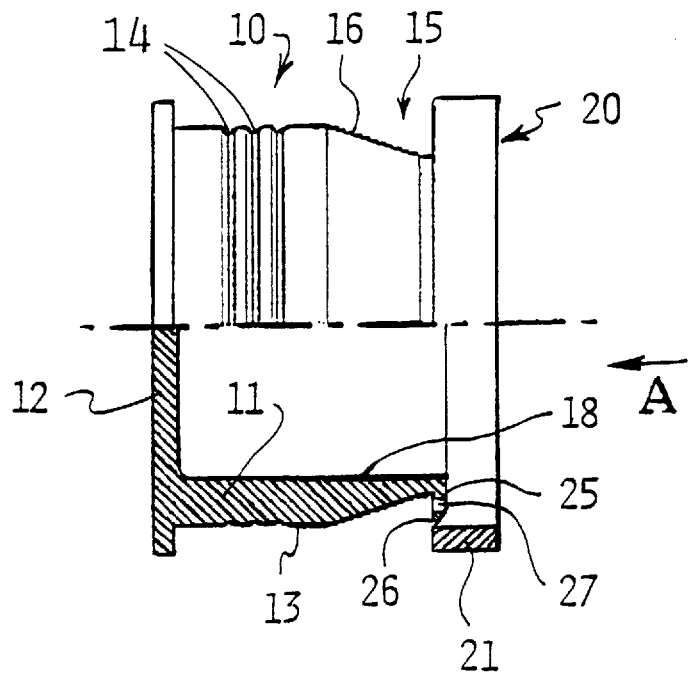
FIG. 1 is a side view, partly in section, of an oesophagus seal according to a possible embodiment of the invention.
Figure 2:
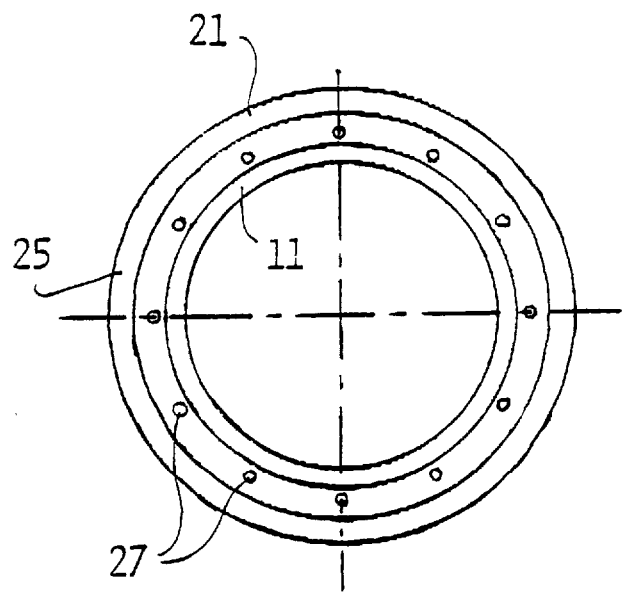
FIG. 2 is an end view looking in the direction of arrow A in FIG. 1.

Referring to FIGS. 1 to 4 of the drawings, the oesophagus seal comprises a plug 10 which has a generally cylindrical body 11 and a closed inner end 12. Around the outside of the body 11 is a generally cylindrical clamp surface 13 having circumferential grooves 14 to resist disengagement of the clamping effect described later.

The plug 10 also has a reduced diameter neck portion 15 which has a conical ramped outside surface 16 leading to the cylindrical surface 13 which has a diameter slightly less than the diameter of the closed end 12. The plug 10 has an open ended socket 18 so that the plug can be mounted to the end of a rod or shaft 30 for insertion into the oesophagus 40 through the oral cavity of the animal while mounted on the end of the rod. The rod 30 can be inserted into the open ended socket 18 of the plug 10 and any suitable releasable connection for the plug 10 can be used, such as a bayonet connection or screwthread connection, enabling the plug 10 to be released from the end of the rod and the rod 30 to be withdrawn from the oesophagus 40 leaving the plug in the desired position sealing the oesophagus 40.

In the embodiment in the drawings, a retainer in the form of a clamp 20 comprises a clamp ring 21 having an inside diameter greater than the outside diameter of the neck portion 15. The inside diameter of the clamp ring 21 may be slightly greater than the outside diameter of the cylindrical clamp surface 13 although it could be substantially equal to or slightly less than the outside diameter of the surface 13 since the clamp ring and/or the plug may be made of a resilient plastics material to enable the clamp ring 21 to be fitted around the outside of the clamp surface 13 to clamp tissues of the oesophagus 40 between the clamp ring 21 and the surface 13.

Figure 3:
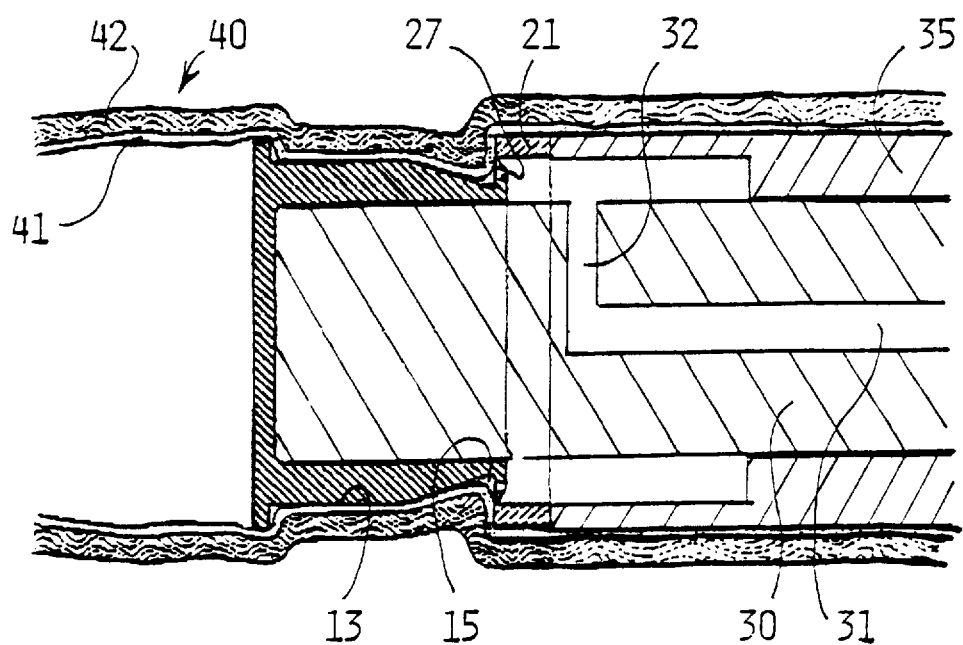
FIG. 3 is a sectional view of the oesophagus seal inserted into the oesophagus to a point where sealing of the oesophagus is desired.

As shown in FIGS. 1 and 3, the clamp ring 21 is initially located beyond the neck portion 15. In this particular embodiment illustrated, the clamp ring 21 is formed integrally with the plug 10 and is initially mounted by a connecting web 25. The point of connection of the web 25 to the clamp ring 21 defines a weakened area 26 which can rupture when an axial force is applied to the ring 21 thereby enabling the ring 21 to move towards the surface 13 past the neck 15. Holes 27 are provided through the connecting web 25 for a purpose described later.

In use of the oesophagus seal illustrated in FIGS. 1 to 4, the assembly comprising the plug 10 and integral clamp ring 21 is mounted on the end of an applicator rod 30. Extending through the rod 30 is a vacuum passage 31 which opens out through passage 32 immediately behind the plug 10. Coaxial with the rod 30 is an actuator sleeve 35 which is selectively movable coaxially with the rod 30 to push the clamp ring 21 past the neck 15 onto the clamp surface 13.

The rod 30 with the oesophagus seal mounted on the end is inserted down the oesophagus 40 of the animal for a suitable distance, e.g. approximately 800 mm in the case of a beef carcass, e.g. to a point approximately adjacent to the eighth rib where the oesophagus is to be sealed.

When the desired position of the oesophagus seal has been reached, a vacuum is applied through the vacuum passage 31 causing a negative pressure relative to the carcass immediately behind the plug 10. The withdrawal of air through the passages 32 and 31 and through the holes 27 communicating with the neck portion 15 causes the oesophagus 40 including the mucosa lining 41 to draw tightly around the oesophagus seal and particularly into the neck 15 as shown in FIG. 3.

Figure 4:
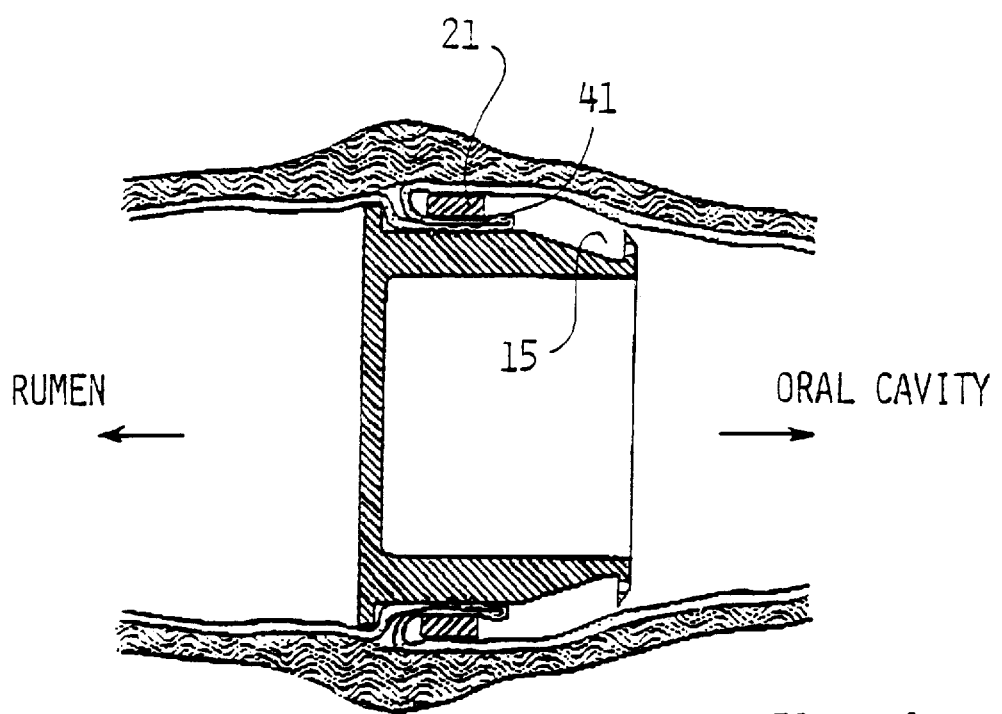
FIG. 4 is a sectional view of the oesophagus seal located in position with the clamp applied so as to seal the oesophagus.

Following the application of vacuum, the operator can operate the actuator sleeve 35 which slides forwardly on the rod 30 applying an axial force to the clamp ring 21. This causes rupture of the weakened zones 26 so that the clamp ring 21 is advanced over the neck 15. This causes pinching of the mucosa 41 which is lining the tunica muscularis 42 and the mucosa 41 separates from the tunica muscularis 42 as the clamp ring 21 is further advanced past the neck 15 and to a position around the outside of the clamp surface 13 until a position approximately as shown in FIG. 4 is reached. The capture and clamping of the mucosa membrane 41 as shown in FIG. 4 provides an effective seal of the oesophagus 40 and strongly resists dislodgment.

The oesophagus seal can be made of any suitable materials such as suitable plastics materials and may be formed, for example, by injection moulding. Preferably the materials enable the clamp ring 21 and/or the plug 10 to resiliently deform to a limited extent during advancement of the clamp ring 21 and clamping of the mucosa 41 although the elastic clamping force applied during clamping needs to be sufficient to apply a strong clamping force so that when applied as shown in FIG. 4, the oesophagus seal will resist forces applied by contents of the rumen and normal handling forces encountered in processing the carcass and viscera. However, it will be appreciated that the materials need not be resilient since by suitable dimensions of the inside diameter of the clamp ring 21 and outside diameter of the clamp surface 13, the compressible tissues of the mucosa 41 can ensure the tight sealing effect is achieved. The material of the seal may be biodegradable to enable the seal to be passed through the "rendering" process for the viscera without needing to retrieve and discard the seal.

Referring now to the embodiment illustrated in FIGS. 5 to 8, the same reference numerals as the embodiments of FIGS. 1 to 4 are used for corresponding features. However, in this second embodiment, the clamp ring 21 is a separate integer from the plug 10 although the plug is similar, having a cylindrical body 11 having a generally cylindrical outer clamp surface 13 with grooves 14 and a closed end 12.

The seal in this second embodiment is applied by an applicator 50 comprising a plug holder 52 and a ring holder 60. The plug holder 52 has a front end 53 which fits within and connects to the open ended socket 18 of the plug 10 so as to mount the plug 10 but which can be selective disconnected from the plug when the plug is installed at the desired point in the oesophagus 40. This can be achieved by the illustrated screw threaded interconnection 19 between the front end 53 and the socket 18, but a quick release connection such as a bayonet connection may be provided in a commercial embodiment.

Behind the front end 53, the plug holder 52 has an intermediate section 54 which is of reduced diameter compared to the cylindrical clamp surface 13 of the plug 10 but which is joined to the cylindrical surface 13 by the conical ramped surface 16 when the plug 10 is mounted on the front end 53. The intermediate section 54 is provided with multiple holes 55 to provide communication for the vacuum applied to draw the tissues of the oesophagus 40 in towards the intermediate section 54 as described later.

The plug holder 52 also includes a rear piston section 56 which locates the plug holder 52 within the ring holder 60 and guides movement of the plug holder 52 out of and back into the ring holder 60 as further described below. The piston section 56 is mounted on the end of a rod 57 which extends rearwardly from the plug holder 52 through a tubular applicator shaft 51 which extends completely out from the animal's oesophagus through the oral cavity when in use.

The ring holder 60 comprises a cylindrical sleeve 61 which accommodates therein the plug holder 52 and which has an internal cavity or bore 62 which receives the piston section 56 for axial movement therein. The outer end 63 of the sleeve 61 has an internally stepped recess 64 for receiving the clamp ring 21. The ring holder 60 is mounted at the end of the applicator shaft 51. Vacuum passage 31 provides a communication path for vacuum applied to the bore 68 of the applicator shaft 51 into the cylindrical bore 62 of the sleeve 61 and thereby into the centre of the intermediate section 54 of the plug holder 52.

Figure 5:
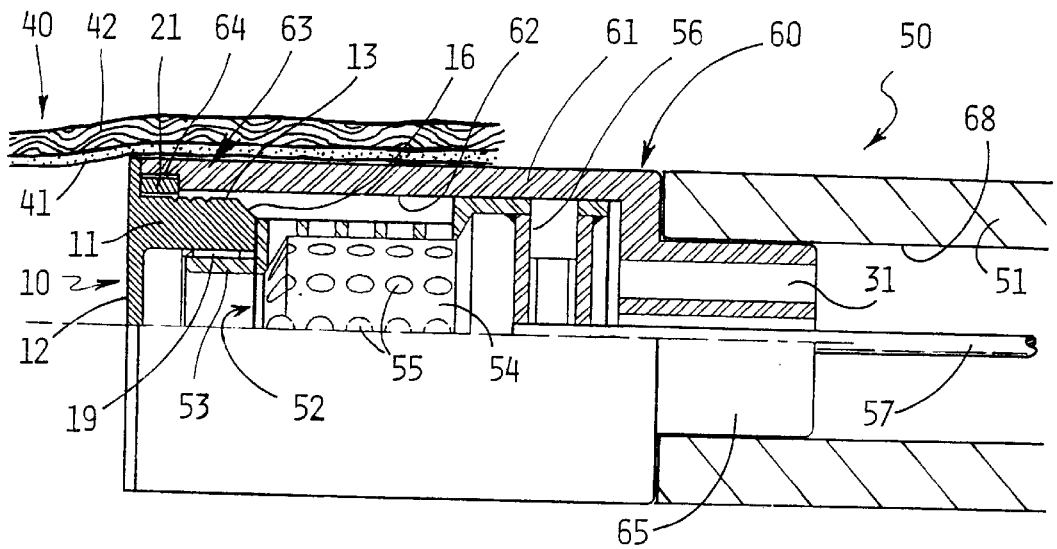
FIG. 5 is a sectional view of an alternative seal and applicator as they are inserted into the oesophagus.

In use of the embodiment of FIGS. 5 to 8, the ring 21 is initially loaded into the recess 64 at the outer end 63 of the sleeve 61 and the plug 10 is mounted to the front end 53 of the plug holder 52. The plug holder 52 is retracted into the ring holder 60 as shown in FIG. 5 for initial insertion of the seal into the oesophagus 40. The applicator 50 is inserted down the oesophagus 40 by insertion of the applicator shaft 51 to the point where sealing is desired, approximately adjacent to the eighth rib.

Figure 6:
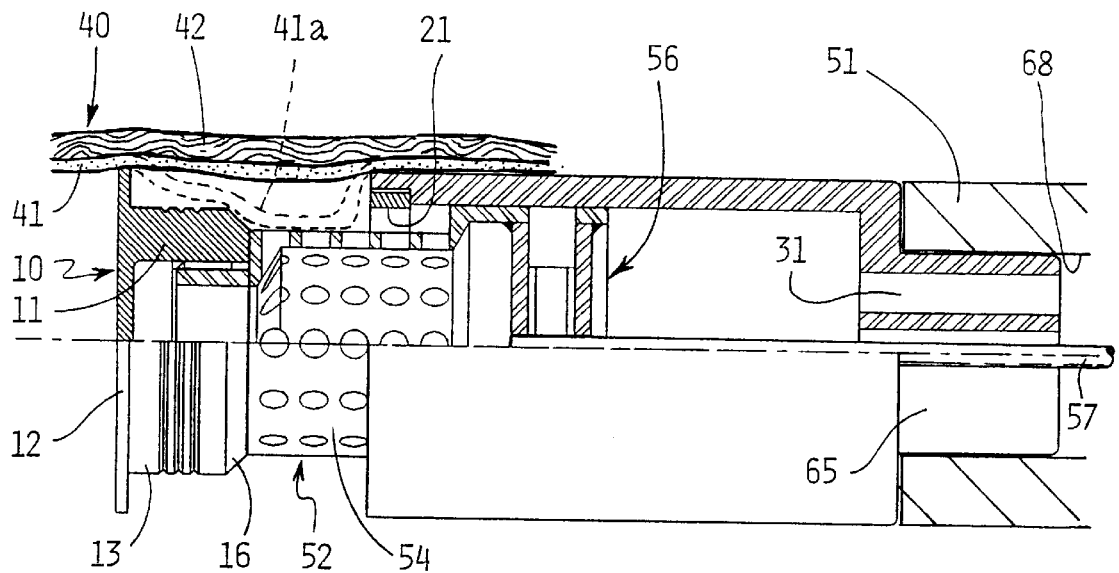
FIGS. 6 and 7 show the sequence of operations of the applicator of FIG. 5.

When the assembly is in position, the operator operates the central rod 57, e.g. by movement of a control lever or the like (not shown) provided at the outside end of the applicator shaft 51, thereby extending the plug holder 52 with the plug 10 mounted on the end to a position as shown in FIG. 6. The clamp ring 21 remains in place at the outer end 63 of the sleeve 61.

When the position shown in FIG. 6 is reached, suction is applied through the bore 68 in the applicator shaft 51 through the vacuum passage 31 and thence to the inside of the plug holder 52, particularly to the inside of the intermediate section 54 provided with the holes 55. This suction draws the mucous membrane 41 inwards around the outside surface 13 of the plug 10 and around the intermediate section 54 as shown in broken line and indicated by the numeral 41a in FIG. 6.

Figure 7:
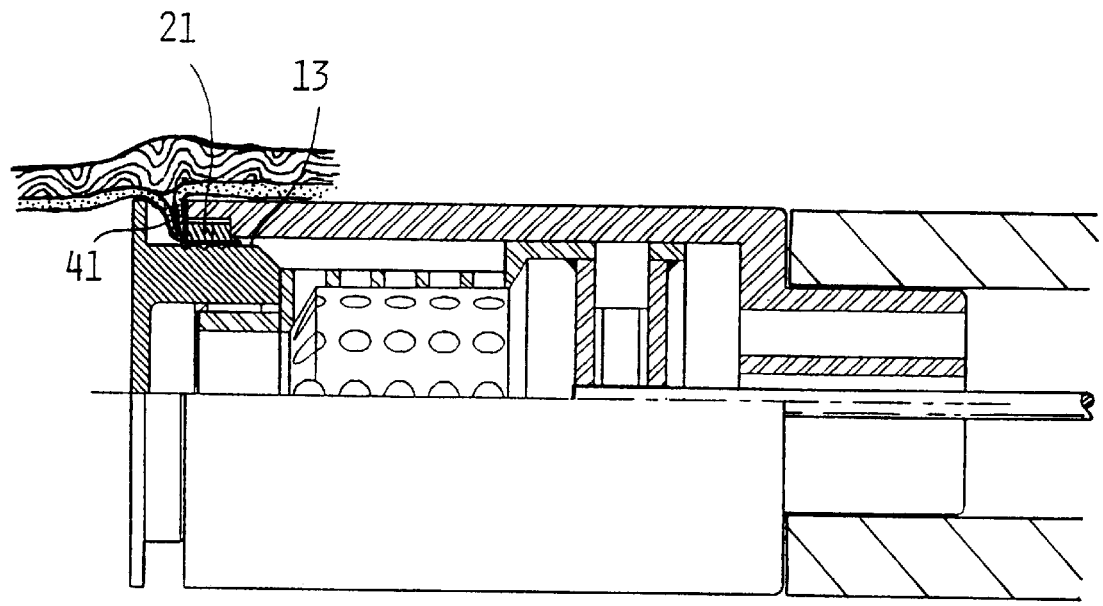

The rod 57 is then retracted again while suction continues to be applied so as to draw the plug 10 back towards the clamp ring 21. The mucous membrane 41 is pinched between the plug 10 and the clamp ring 21 as the conical ramped surface 16 is retracted back through the clamp ring 21 and as the cylindrical outer surface 13 is also retracted back through the clamp ring 21. This effectively clamps the mucous membrane between the ring 21 and the surface 13 as shown in FIG. 7, thus installing the seal in the oesophagus.

Figure 8:
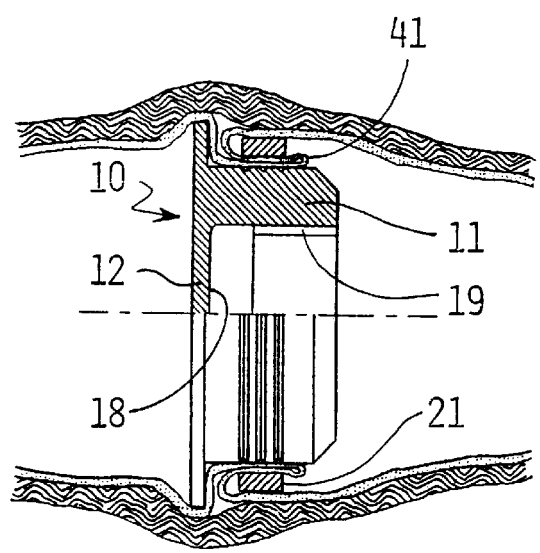
FIG. 8 is a sectional view of the oesophagus seal of FIG. 5 located and sealing the oesophagus.

Finally, the connection between the front end 53 of the plug holder 52 and the plug 10 is released, e.g. by rotating the rod 57 to unscrew the threaded connection 19 in the embodiment illustrated. The applicator 50 comprising the applicator shaft 51, ring holder 60, and plug holder 52, is then retracted out through the animal's oral cavity leaving the seal in place and sealing the oesophagus as shown in FIG. 8. The retracted assembly can be placed in a cleaning unit for washing and sterilising before the next carcass is processed.

The application of suction to the bore 68 provided axially through the applicator shaft 51 may be achieved by the connection of a vacuum source to the outside end of the applicator shaft 51 and by providing an associated valve which the operator can selectively open to apply the vacuum at the desired point in the sequence of operations. Alternatively, there may be provided an associated partial vacuum generator provided as part of the applicator. For example, there may be provided a piston and cylinder arrangement, the cylinder being in communication with the bore 68 provided through the applicator shaft 51 and means for selectively retracting the piston within the cylinder to create a partial vacuum within the cylinder behind the piston and which is communicated through the bore 68 in the shaft 51.

In a yet further possible arrangement for creating the partial vacuum to draw the mucous membrane 41 in towards the intermediate section 54, the back end 65 of the ring holder 60 may be closed except for a central bore through which the rod 57 passes, with a sealing ring being provided between the rod 57 and the bore through which is passes. With this arrangement, the extension of the plug holder 52 out of the sleeve 61 will create a partial vacuum within the zone of the sleeve 61 behind the piston section 56 of the plug holder 52 which, by communication between the interior of the intermediate section 54 and the zone behind the piston section 56, will create a partial vacuum within the intermediate section 54 thereby drawing the mucous membrane 41 inwardly similar to that shown in FIG. 6. Although retraction again of the intermediate section 54 into the sleeve 61 will reduce the suction effect, the suction nevertheless may be sufficient for the mucous membrane 41 to be commenced to be captured and clamped within the ring 21.

Figure 9:
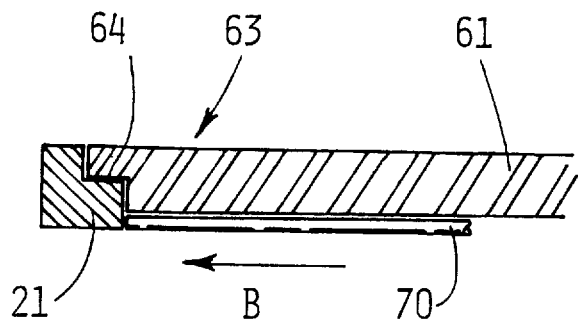
FIG. 9 is a sectional view of an alternative clamp ring and modified mounting sleeve.

In FIG. 9, the clamp ring 21 is L-shaped in cross section and is located in the recess 64 in the end 63 of the sleeve 61. When the mucous membrane 41 is clamped as shown in FIG. 7 immediately prior to retraction of the applicator 50 out through the oral cavity, the ring 21 can be pushed off the end 63 of the sleeve by movement of the ejector arm 70 in the direction of arrow B. The ejector arm 70 can be remotely operated by the user, e.g. by suitable linkages and through a rod or cable extending through the shaft 51.

Figure 10:
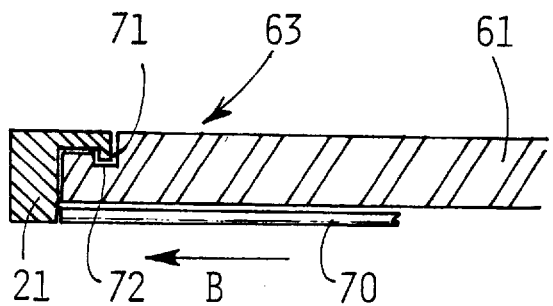
FIG. 10 is a sectional view of a further embodiment of clamp ring and mounting sleeve.

In FIG. 10, the modified clamp ring 21 snap fits onto the end 63 of the sleeve 61 by means of the projection 71 fitting into groove 72 around the sleeve 61. The ejector arm 70 is operated as described in reference to FIG. 9. In the case of FIG. 10 however, the resilient material of which the ring 21 is composed allows a more positive retention of the ring 21 until the desired point of the operational sequence of installation is reached.

Figure 11:
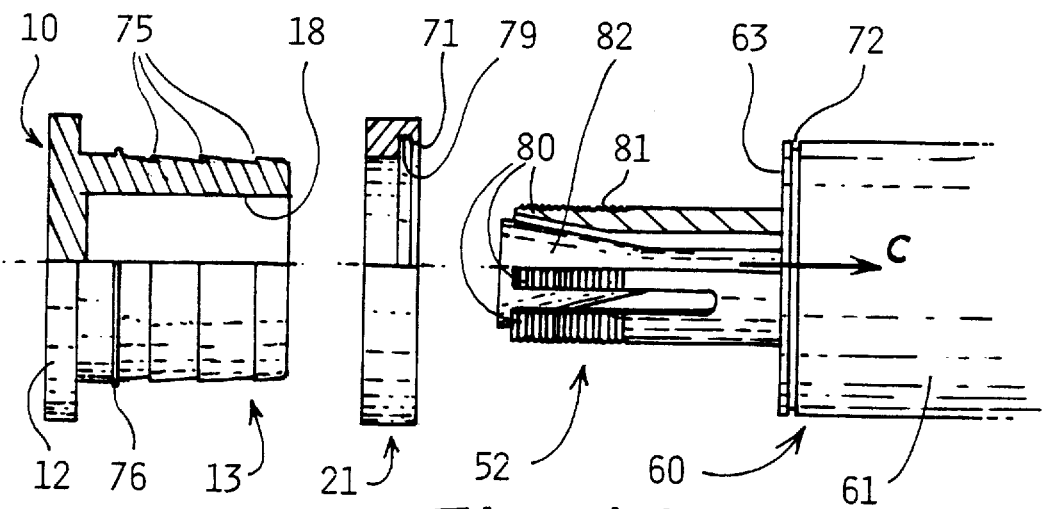
FIG. 11 depicts a further embodiment of an oesophagus seal, shown partly in section, and applicator.

The system in FIG. 11 has a plug 10 with an outside clamp surface 13 provided with steps or serrations 75 to resist displacement of the clamp ring 21 when located with mucous tissues clamped against the clamp surface. The slightly projecting bead 76 has a diameter sized to retain the clamp ring between the enlarged diameter closed end 12 and the bead 76, e.g. during packing and storage, but to allow the ring 21 to be retracted past the bead 76 during use.

The plug holder 52 has a number of fingers 80 provided with external grooves, knurling 81 or the like to grip and hold the inside surface of the socket 18 in the plug 10. The fingers 80 when in their relaxed state fit inside the socket 18, but can be expanded outwardly to hold the plug 10 by retraction of the conical head 82 by any suitable means in the direction of arrow C. The plug 10 is thus held by the plug holder 52 during insertion into the oesophagus until the conical head 82 is later advanced again enabling the fingers 80 to relax and release the plug in its desired position in the oesophagus.

The clamp ring 21 has an internal groove 79 and projection 71 which, like the embodiment of FIG. 10, fits into groove 72 at the end 63 of sleeve 61 constituting the ring holder 60. In this embodiment there is no ejector 70 of the kind shown in FIGS. 9 and 10 since the engagement of the projection 71 of the clamp ring 21 in the groove 72 is a moderately weak interference fit which is overcome by the strength of the clamping and gripping of the mucosa between the ring 21 and the clamp surface 13. Therefore, as the applicator assembly is retracted, the ring 21 disengages from the end 63 of the ring holder 60 and remains in place clamping the mucosa around the outside of the plug 10.

Trials of a seal according to the embodiments shown in the drawings have indicated that it is possible to achieve superior sealing effect (as tested by burst tests for different types of seals applied to bovine oesophaguses) when compared to elastrator rings or plastic clip seals. Although the oesophagus seal and the sealing system of the present invention have been particularly developed and tested for use in slaughtered bovines, the seal and system are useable with other animals such as pigs and sheep.

It will be appreciated that variations of the construction and operation described in detail and illustrated are possible. For example, instead of application of vacuum to draw tissues into the neck 15, suitable outside dimensions for the plug 10 may be provided so that normal relaxation of the expanded oesophagus 40 is sufficient to cause the mucosa to enter the neck 15. To help ensure that clamping by pinching of the mucosa 41 occurs as the clamp ring 21 is relatively advanced over the surface 13, small barbs pointing back towards the oral cavity can be provided on the outside ramp surface 16 of the neck 15.

The oesophagus seal and system as herein described and illustrated enables the oesophagus to be effectively sealed internally without need for cutting open of the carcass, e.g. in the neck region. The seal and system enable the elimination of the rodding operation which is a strenuous operation and which involves substantial risks of contamination of tissues of commercial value.

We claim:

1. An oesophagus seal for sealing the oesophaqus in a slaughtered animal, the oesophagus seal comprising a plug for insertion into the oesophagus to a point where sealing of the oesophagus is desired, and a retainer associated with the plug for internally engaging tissues of the oesophagus to resist disengagement of the plug by holding or retaining the plug in position to seal the oesophagus, the retainer comprising a clamp which is operative to clamp internal tissues of the oesophagus by pinching the tissues.

2. An oesophagus seal as claimed in claim 1 wherein the oesophagus of the animal comprises the tunica muscularis and its associated internal lining mucosa, the clamp being operative to clamp the mucosa by pinching internally so that the mucosa separate from the tunica muscularis in the region where the clamp pinches but without the mucosa being pierced or perforated.

3. An oesophagus sealing system comprising an oesophagus seal as claimed in claim 1 and an applicator rod having an end for mounting of the oesophagus seal, with the applicator rod having an associated actuator which is selectively movable axially to move the clamp so as to engage and clamp the tissues of the oesophagus between the clamp and the plug.

4. An oesophagus sealing system as claimed in claim 3 wherein the applicator rod has a vacuum passage extending therethrough, with the vacuum passage opening outwardly immediately behind the end where the plug is in use mounted whereby in use a vacuum can be applied immediately behind the plug when it has been moved to the point where sealing of the oesophagus is desired, with the application of the vacuum drawing tissues of the oesophagus into closer relationship with the plug to facilitate clamping thereof.

5. An oesophagus seal as claimed in claim 1 wherein the plug has an outer clamp surface extending completely around the periphery of the plug and adjacent the internal tissues and the clamp is operative to clamp the internal tissues against the outer clamp surface throughout its circumference so that passage of a fluid between the internal tissues and the plug at any part of the circumference of the clamp surface is prevented.

6. An oesophagus seal as claimed in claim 5 wherein the clamp is in the form of a clamp ring which is operative to clamp the internal tissues of the oesophagus between the clamp ring and the outside clamp surface of the plug.

7. An oesophagus seal as claimed in claim 6 wherein the clamp ring is operative to clamp the tissues by pinching the tissues between the clamp ring and the outside clamp surface of the plug and resisting disengagement by a tight interference fit.

8. An oesophagus sealing system comprising an oesophagus seal as claimed in claim 6 and an applicator for mounting of the oesophagus seal, the applicator comprising a plug holder having a front end to which the plug is in use mounted and which is selectively disconnectable from the plug when the plug is installed at the desired point in the oesophagus, and a ring holder arranged to receive and hold the clamp ring, the ring holder being selectively axially movable relative to the plug whereby in use the clamp ring can be relatively advanced into operative relationship with the plug so as to clamp tissues of the oesophagus between the clamp ring and the plug.

9. An oesophagus sealing system as claimed in claim 8 wherein the plug holder has an intermediate section behind the front end thereof to which the plug is in use mounted, the intermediate section being of reduced diameter compared to the outside clamp surface of the plug, the applicator having a vacuum passage leading to the intermediate section, the ring holder in use locating the clamp ring beyond the intermediate section relative to the plug whereby the application of vacuum through the vacuum passage to the intermediate section draws tissues of the oesophagus inwardly to constrict around the intermediate section, whereafter axial advancement of the ring holder and the clamp ring past the intermediate section and into operative relationship with the plug causes pinching and hence clamping of the tissues between the clamp ring and the outside clamp surface of the plug.

10. An oesophagus seal for sealing the oesophagus in a slaughtered animal, the oesophagus seal comprising a plug for insertion into the oesophagus to a point where sealing of the oesophagus is desired, and a retainer associated with the plug for internally engaging tissues of the oesophagus to resist disengagement of the plug by holding or retaining the plug in position to seal the oesophagus, the retainer comprising a clamp which is operative to clamp internal tissues of the oesophagus; wherein the plug has an outer clamp surface extending completely around the periphery of the plug and adjacent the internal tissues and the clamp is operative to clamp the internal tissues against the outer clamp surface throughout its circumference so that passage of a fluid between the internal tissues and the plug at any part of the circumference of the clamp surface is prevented.

11. An oesophagus seal as claimed in claim 10 wherein the clamp is in the form of a clamp ring which is operative to clamp the internal tissues of the oesophagus between the clamp ring and the outside clamp surface of the plug.

12. An oesophagus seal as claimed in claim 11 wherein the clamp ring is operative to clamp the tissues by pinching the tissues between the clamp ring and the outside clamp surface of the plug and resisting disengagement by a tight interference fit.

13. An oesophagus seal as claimed in claim 11 wherein the outer clamp surface is cylindrical and the clamp ring in use surrounds the cylindrical outer clamp surface and pinches tissues of the oesophagus between the clamp ring and the cylindrical outer clamp surface.

14. An oesophagus seal as claimed in claim 11 wherein the plug has a closed inner end and a reduced diameter neck portion located further from the closed inner end than the outer clamp surface, the neck portion having a conical ramped outer surface leading to the clamp surface, the clamp ring having an inside diameter greater than the outside diameter of the neck portion, the clamp ring initially being located beyond the neck portion and being advanceable towards the inner end of the plug when the plug has been inserted into the oesophagus to the point where sealing of the oesophagus is desired whereby tissues surrounding and projecting into the neck portion will be pinched between the advancing clamp ring and the conical ramped outside surface of the neck portion and, upon further advance of the clamp ring, the tissues of the oesophagus will be clamped between the clamp ring and the outer clamp surface of the plug.

15. An oesophagus seal as claimed in claim 14, wherein the clamp ring is formed integrally with the plug, the connection between the clamp ring and the plug having a weakened area which can rupture when an axial force is applied to the clamp ring so as to separate the clamp ring from the plug and advance it towards the closed inner end of the plug to effect clamping of the tissues.

16. An oesophagus seal as claimed in claim 15 wherein the plug is adapted to be mounted to the end of an applicator rod which in use is to be inserted along the oesophagus and wherein the integral formation of the clamp ring with the plug includes gas passages enabling a vacuum applied behind the plug when located in the oesophagus to be communicated through the gas passages to the neck portion whereby tissues of the oesophagus can be drawn into the neck portion before advancement of the clamp ring to clamp the tissues drawn into the neck portion.

17. An oesophagus sealing system comprising an oesophagus seal as claimed in claim 11 and an applicator for mounting of the oesophagus seal, the applicator comprising a plug holder having a front end to which the plug is in use mounted and which is selectively disconnectable from the plug when the plug is installed at the desired point in the oesophagus, and a ring holder arranged to receive and hold the clamp ring, the ring holder being selectively axially movable relative to the plug whereby in use the clamp ring can be relatively advanced into operative relationship with the plug so as to clamp tissues of the oesophagus between the clamp ring and the plug.

18. An oesophagus sealing system as claimed in claim 17 wherein the plug holder has an intermediate section behind the front end thereof to which the plug is in use mounted, the intermediate section being of reduced diameter compared to the outside clamp surface of the plug, the applicator having a vacuum passage leading to the intermediate section, the ring holder in use locating the clamp ring beyond the intermediate section relative to the plug whereby the application of vacuum through the vacuum passage to the intermediate section draws tissues of the oesophagus inwardly to constrict around the intermediate section, whereafter axial advancement of the ring holder and the clamp ring past the intermediate section and into operative relationship with the plug causes pinching and hence clamping of the tissues between the clamp ring and the outside clamp surface of the plug.

19. An oesophagus sealing system for sealing the oesophagus in a slaughtered animal comprising, in combination: an oesophagus seal comprising a plug for insertion into the oesophagus to a point where sealing of the oesophagus is desired, and a retainer associated with the plug for internally engaging tissues of the oesophagus to resist disengagement of the plug by holding or retaining the plug in position to seal the oesophagus, the retainer comprising a clamp which is operative to clamp internal tissues of the oesophagus; and an applicator rod having an end for mounting of the oesophagus seal, the applicator rod having an associated actuator which is selectively movable axially to move the clamp so as to engage and clamp the tissues of the oesophagus between the clamp and the plug.

20. An oesophagus sealing system as claimed in claim 19 wherein the applicator rod has a vacuum passage extending therethrough, the vacuum passage opening outwardly immediately behind the end where the plug is in use mounted whereby in use a vacuum can be applied immediately behind the plug when it has been moved to the point where sealing of the oesophagus is desired, the application of the vacuum drawing tissues of the oesophagus into closer relationship with the plug to facilitate clamping thereof.

* * * * *